United States Patent [19]

Levens

[11] 4,303,485
[45] Dec. 1, 1981

[54] ULTRAVIOLET POLYMERIZATION OF ACRYLATE MONOMERS USING OXIDIZABLE TIN COMPOUNDS

[75] Inventor: Dennis L. Levens, Hudson, Wis.

[73] Assignee: Minnesota Mining and Manufacturing Company, Saint Paul, Minn.

[21] Appl. No.: 68,109

[22] Filed: Aug. 20, 1979

[51] Int. Cl.³ .............................................. C08F 2/46
[52] U.S. Cl. .......................... 204/159.24; 204/159.22; 427/44; 428/442; 526/329.7
[58] Field of Search ................. 204/159.24; 526/329.7

[56] References Cited

U.S. PATENT DOCUMENTS

| | | | |
|---|---|---|---|
| 2,791,504 | 5/1957 | Plambeck | 156/668 |
| 3,202,513 | 8/1965 | Thommes | 96/115 |
| 3,605,953 | 9/1971 | Caldwell et al. | 188/1 |
| 3,740,366 | 6/1973 | Sanderson et al. | 260/29.6 M |
| 4,181,752 | 1/1980 | Martens et al. | 427/54.1 |

FOREIGN PATENT DOCUMENTS 675420  5/1966  Belgium .

*Primary Examiner*—Harold D. Anderson

[57] ABSTRACT

Photopolymerizable mixture of alkyl acrylate and/or methacrylate and preferably also copolymerizable monoethylenic monomer such as acrylic acid in which is dissolved an oxidizable tin salt such as stannous octoate. The tin salt permits thick layers of the mixture to be photomolymerized in air and allows an unusual tolerance of oxygen when photopolymerizing thin layers such as to provide pressure-sensitive adhesive coatings.

11 Claims, No Drawings

ULTRAVIOLET POLYMERIZATION OF ACRYLATE MONOMERS USING OXIDIZABLE TIN COMPOUNDS

BACKGROUND TO THE INVENTION

Pressure-sensitive adhesive tape is generally manufactured by coating onto a backing sheet a solution or emulsion of a pressure-sensitive adhesive polymer. The equipment necessary to drive off the volatile vehicle is usually very expensive, including elaborate drying ovens and massive ducting. The evolved vehicle tends to pollute the atmosphere, even if it is primarily water, unless the ovens are equipped to recover the pollutants. Such recovery equipment is expensive both to construct and to operate.

Belgian Pat. No. 675,420 which was published May 16, 1966, concerns a process for making pressure-sensitive adhesive tape which evolves no volatile vehicle. While maintaining an inert atmosphere, a mixture of acrylic monomers is coated onto a backing sheet and then polymerized in situ to a pressure-sensitive adhesive state. In each of the examples, the polymerization is initiated by ultraviolet radiation. The monomer mixture of Example 1 consists of 90 parts ethylhexyl acrylate, 5 parts acrylic acid and 5 parts polyvinylisobutyric acid. This and the acrylic monomer mixtures of each of the other examples are so low in viscosity as to make it difficult to obtain uniform coatings. The patent suggests that to increase the viscosity, the monomer mixture can be pre-polymerized prior to coating, either by ultraviolet radiation or by any other means. If polymerized by ultraviolet radiation, an inert atmosphere would be necessary.

U.S. Pat. No. 4,181,752 (Martens et al.) discloses a process for making a pressure-sensitive adhesive by polymerizing a radiation-sensitized solventless liquid mixture containing as a major proportion thereof at least one acrylic acid ester of an alkyl alcohol, said alcohol containing from 4 to 14 carbon atoms. The mixture preferably includes at least one monomer copolymerizable therewith. The process is similar to that of Belgian Pat. No. 675,420 except that the Belgian patent discloses nothing of the specific intensity and the specific spectral distribution of the irradiation. U.S. Pat. No. 4,181,752 discloses that these must be controlled in order to attain desirably high cohesive strength and also to attain high peel resistance, namely, to subject the polymerizable mixture to radiation in the near ultraviolet region at a rate of irradiation in the 3000–4000 Angstrom wavelength range of not more than 7 milliwatts per square centimeter of the mass exposed, said radiation allowably also containing incidental radiation energy, the amount of said incidental radiation energy having wavelengths shorter than 3000 Angstroms being limited to not more than about 10% of the amount of energy in the 3000–4000 Angstrom range. Because the same specific intensity and specific spectral distribution of the irradiation are preferred for the practice of the present invention, the disclosure of U.S. Pat. No. 4,181,752 is here incorporated by reference.

OTHER PRIOR ART

U.S. Pat. No. 3,202,513 (Thommes) teaches a process for making printing reliefs by exposing to actinic radiation coatings of addition-polymerizable diacrylates and dimethacrylates of etherglycols. If such coatings are stored in air before being polymerized, the relief image areas are poorly anchored to the support and are of poor quality unless the coatings contain a stannous salt.

U.S. Pat. No. 3,740,366 (Sanderson) concerns pressure-sensitive adhesive copolymers of alkyl acrylates and copolymerizable ethylenically unsaturated acids crosslinked by a compatible polyvalent metal compound, thus improving the shear strength with no appreciable loss of tackiness. Among the large number of polyvalent metal salts suggested in the patent is tin tartrate (col. 5, line 9). The polyvalent metal ions provide ionic crosslinking between the carboxyl groups of the copolymers.

THE PRESENT INVENTION

The present invention encompasses a process for producing viscoelastic material, especially pressure-sensitive adhesive layers, which process, like that of the aforementioned Belgian Pat. No. 675,420, requires no drying ovens and produces essentially no volatile matter. An advantage over the Belgian process is that even though polymerization of thin layers in the process of the invention requires an inert atmosphere, a greater tolerance of oxygen is permitted in comparison to the Belgian process, possibly as much as a 10- to 20-fold increase. The tolerance of oxygen increases at increased thicknesses to the point that layers exceeding about 1.5 mm in thickness can surprisingly be polymerized in air. This unexpected result is also not achieved in the aforementioned U.S. Pat. No. 4,181,752 even though that patent and the present invention are concerned with polymerizing the same monomers.

Because materials useful in the novel process tend to be transparent, both before and during polymerization, layers far thicker than 1.5 mm are possible. In one instance, a single layer was polymerized in air to a thickness of several centimeters. The full thickness of a thick layer appears to cure simultaneously, thus resulting in a smooth surface. In contrast, thick layers produced by the process of the Belgian patent appear to cure progressively from the surface on which the ultraviolet radiation impinges, thus tending to produce a wrinkled surface.

Briefly the process of the present invention involves the steps of (1) mixing together by weight
  (a) 100 parts of a composition consisting of 50–100 parts of alkyl acrylate and/or methacrylate and 0–50 parts of copolymerizable monoethylenically unsaturated monomer,
  (b) oxidizable tin salt dissolved in an amount providing at least 0.01 part of tin, and
  (c) addition-polymerization photoinitiator which is activatable by ultraviolet radiation and is dissolved in an amount providing about 0.01–5 parts, and (2) exposing to ultraviolet radiation to photopolymerize the mixture to a viscoelastic state.

If the photopolymerization is carried out in a layer exceeding about 1.5 mm in thickness, an exotherm results and crosslinking is observed. However, essentially no crosslinking is noted in thinner layers unless a crosslinking agent is added to the photopolymerizable mixture. Interreactive crosslinking agents include copolymerizable polyethylenically unsaturated monomers as disclosed in the aforementioned U.S. Pat. No. 3,202,513 at col. 5, lines 20–45, particularly the diacrylates and dimethacrylates of etherglycols. When producing pressure-sensitive adhesives, care must be taken in the use of these copolymerizable crosslinking agents to avoid undue loss of tackiness. For this reason it is usually desirable that the copolymerizable crosslinking agent be used in amounts less than five percent by weight of the photopolymerizable mixture. Copolymerizable crosslinking agents of lower equivalent weight should be used in smaller amounts.

Alternatively, crosslinking can be initiated by a photoactivatable crosslinking agent such as benzaldehyde, acetaldehyde, anthraquinone, substituted anthraquinones, various benzophenone-type compounds and certain chromophore-substituted vinylhalomethyl-s-triazines, such as 2,4-bis(trichloromethyl)-6-p-methoxystyryl-s-triazine. These photoactivatable crosslinking agents can be effective in amounts as small as 0.01 percent and as great as about 5 percent by weight of the photopolymerizable mixture.

As pointed out above, it is not necessary to exclude air when photopolymerizing a mixture of the above constituents (a), (b) and (c), with or without a crosslinking agent, in layers exceeding about 1.5 mm in thickness. For layers of lesser thickness, any inert atmosphere such as nitrogen, carbon dioxide, helium or argon is suitable and, as noted above, some oxygen can be tolerated. A sufficiently inert atmosphere can be achieved by covering the layer with a plastic film which is transparent to ultraviolet radiation and irradiating through that sheet in air.

For most uses, pressure-sensitive adhesive layers are 25 to 250 micrometers in thickness and hence need to be photopolymerized in a sufficiently inert atmosphere. Since the photopolymerizable mixture is initially of such low viscosity that it normally cannot be coated uniformly at such thickness, the mixture preferably is partially photopolymerized to a coatable viscosity such as 300 to 10,000 centipoises at ordinary room temperature. This can be done by ultraviolet radiation of a container of the mixture in air. The partial photopolymerizing may be stopped at any point simply by turning off the ultraviolet radiation. Generally less than one minute is required to attain a syrup of coatable viscosity, and about one to five minutes is usually sufficient to polymerize a thin layer of the syrup to a pressure-sensitive adhesive state. The precise lengths of time are dependent upon the intensity of the ultraviolet irradiation, the amount of dissolved tin, and the amount and efficacy of the photoinitiator.

The photopolymerizable mixture of the above constituents (a), (b) and (c) is itself believed to be a viable article of commerce and to be novel and patentable as are the partially and substantially fully polymerized products thereof. If either the photopolymerizable mixture or a partially-polymerized syrup thereof, whether or not it contains a crosslinking agent, is stored in an airtight, light-proof drum at ordinary warehouse temperatures, it should remain unchanged for extended periods. The partially-polymerized syrups are likely to be favored in commerce, because without further modification, the purchaser will be able to coat out the syrup and, by exposing the coating briefly to ultraviolet radiation, convert the coating to its desired end use, e.g., as a pressure-sensitive adhesive tape.

Extensive testing indicates that any alkyl acrylate or methacrylate is useful in the present invention. Especially useful are n-propyl acrylate and alkyl acrylates wherein the alkyl group has 4–12 carbon atoms and is not highly branched. These are readily photopolymerized in the practice of the invention to a pressure-sensitive adhesive state, either alone or in combination with various copolymerizable monoethylenically unsaturated monomers at ratios of about 88 parts or more of the alkyl acrylate or acrylates having an average of 4–12 carbon atoms in their alkyl groups and up to about 12 parts by weight of the copolymerizable monomer or monomers.

Acrylates and methacrylates having shorter alkyl chains photopolymerize somewhat more slowly and to a tack-free state. Preferably somewhat larger amounts of the oxidizable tin salt and photoinitiator are employed to speed up their photopolymerization. Whether or not a polymer of the present invention is tacky at room temperature, it may be useful as a viscoelastic damping material for such uses as in U.S. Pat. No. 3,605,953 (Caldwell et al.). Among short-chain acrylates and methacrylates which have been used successfully in the invention are methyl acrylate, methyl methacrylate and ethyl acrylate. Octadecyl acrylate has also been successfully homopolymerized in the practice of the invention.

Products of the present invention which are not tacky develop tackiness when heated to elevated temperatures well below the temperature at which they might become degraded.

Copolymerizable monoethylenically unsaturated monomers which have been successfully used in the invention include acrylic acid, methacrylic acid, itaconic acid, acrylamide, ethoxyethyl acrylate, N-vinylpyrrolidone, maleic anhydride, isooctyl vinyl ether, N-tert-butylacrylamide, acrylonitrile and vinylidene chloride. Other copolymerizable monoethylenically unsaturated monomers which should be useful are styrene, vinyltoluene, methacrylonitrile, hydroxyalkyl acrylates and cyanoethyl acrylate.

In order to enhance the internal strength of polymerized products of the invention, it is desirable that part or all of the copolymerizable monoethylenically unsaturated monomers of constituent (a) have highly polar groups such as are present in acrylic acid, methacrylic acid, itaconic acid, acrylamide, methacrylamide, N-substituted acrylamides, acrylonitrile, methacrylonitrile, hydroxyalkyl acrylates, cyanoethyl acrylate, N-vinylpyrrolidone and maleic anhydride.

Oxidizable tin salts which are preferred because they readily dissolve in the above constituent (a) at room temperature include stannous octoate, stannous chloride, stannous oleate, stannous naphthenate, stannous trifluoromethane sulfonate and tributyltin hydride. The latter is the only non-stannous oxidizable tin salt which has been found to be useful and is believed to be effective because of its active hydrogen. In all cases, the tin is believed to be in the stannic form in the substantially fully polymerized products, but this has not been verified.

Oxidizable tin salts which are more difficultly soluble, and hence less preferred, include stannous acetate, stannous stearate and stannous laurate. Even with heat and vigorous stirring, they are very slow to dissolve.

A number of readily soluble stannic salts, which were not oxidizable, were tried but proved not to be effective.

Known addition-polymerization photoinitiators useful as the above constituent (c) include the acyloin ethers (such as benzoin methyl ether or benzoin isopropyl ether), anisoin methyl ether and anisoin isopropyl ether, substituted acryloin ethers (such as alpha-hydroxymethylbenzoin methyl ether), aromatic sulfonyl chlorides (such as 2-naphthalenesulfonyl chloride), substituted acetophenones (such as α, α-diethoxyacetophenone), photoactive oximes [such as 1-phenyl-1,1-propanedione-2-(O-ethoxycarbonyl)oxime].

Increased amounts of photoinitiator up to about 0.5 percent by weight and increased amounts of oxidizable tin salt up to about 0.5 percent by weight of dissolved tin in the polymerizable mixture each tend to increase the rate of reaction. Because of the exothermic polymerization, it is preferred in forming completely polymerized layers of more than 1.5 mm thickness to keep each of these below 0.1 percent. When completely polymerizing layers of 0.05 to 0.2 mm in thickness, preferred amounts of photoinitiator and of dissolved tin are each about 0.1 to 0.3 percent by weight of the polymerizable mixture.

The extent of polymerization can be monitored by measuring the refractive index of the polymerizable mixture. For example, the refractive index may change from about 1.43 for a partially polymerized syrup to about 1.47 at about 100% reaction. The change in refractive index occurs linearly with conversion of acrylate unsaturation. See for example discussions about the method in *Polymerization at Advanced Degrees of Conversion*, G. P. Gladyshev and K. M. Gibov, Keter Press, Jerusalem, 1970.

In the practice of the present invention, about 100% reaction was achieved at about 1600 parts of oxygen per million parts of an inert atmosphere at a coating thickness of about 0.125 mm. No test was made as to whether greater oxygen content could be tolerated. In the process of the Belgian Pat. No. 675,420, it is believed that there should be less oxygen than 300 parts per million to obtain about 100% reaction.

Even though the photopolymerization is initiated by ultraviolet radiation, it has been found that coatings and thick sections can be pigmented to the point that they are almost opaque while still being polymerized to about 100% reaction. For example, a polymerizable mixture comprising 90 parts isooctyl acrylate and 10 parts by weight acrylic acid was prepared containing 0.5 part kaolinite clay and was polymerized in air at a thickness of 1.3 cm. The polymerized slab was tough and resilient and had an almost opaque beige color. Additional portions of the polymerizable mixture respectively contained the following parts of other pigments and were photopolymerized to a tough, resilient state at a thickness of about 1.3 cm. Each was almost opaque.

| Parts | Pigment | Appearance |
|---|---|---|
| 0.1 | aluminium powder | Metallic aluminum color |
| 0.3 | titanium dioxide (anatase) | Milky |
| 0.1 | red paste (Verona UN-1547) | Light red |

Other materials which can be mixed with the above constituents (a), (b) and (c) include tackifiers, reinforcing agents and other modifiers which may copolymerize with constituent (a) or photopolymerize independently.

Glass microbubbles having an average diameter of 10 to 200 micrometers can be mixed with the above constituents (a), (b) and (c) when they are selected to polymerize to a pressure-sensitive adhesive state as taught in German Offenlegungsschrift No. 28 21 606, laid open Nov. 30, 1978. If the microbubbles comprise 20 to 65 volume percent of the pressure-sensitive adhesive, the polymerized product will have a foam-like appearance and be suitable for uses to which foam-backed pressure-sensitive adhesive tapes are put.

Although it has been necessary to carry out the polymerization of thin layers in an inert atmosphere, an extraordinary phenomenon has been noted. After polymerizing a thick section in a beaker in air, a thin layer of about 0.1 mm of the same polymerizable mixture was poured onto the surface. Upon exposure to ultraviolet radiation in air, the thin layer polymerized, and there was no visible interface. Another thin layer of about 0.1 mm of the same mixture except for elimination of the oxidized tin salt was then poured onto the surface. This was exposed to ultraviolet radiation in air, and again the thin layer polymerized, and there was no visible interface.

In the following examples, all parts are by weight. Examples 1-7 and 9-13 used a pair of ultraviolet lamps, namely, Sylvania "Blacklite Blue" F15T8-BLB. At a distance of about 20 cm, these provided an intensity of about 2 milliwatts per cm$^2$. The ultraviolet lamps used in Example 8 were General Electric F40-BL. The spectral range of both type of lamps was primarily 3000-4000 Angstroms, their radiation energy at shorter wavelengths being less than about 10% of their energy in the 3000-4000 Angstroms range. The addition-polymerization photoinitiator used in all of the examples was alpha-hydroxymethylbenzoin methyl ether ("Irgacure" 651).

EXAMPLE 1

|  | Grams |
|---|---|
| Isooctyl acrylate (IOA) | 90 |
| Acrylic acid (AA) | 10 |
| Photoinitiator | 0.2 |
| Stannous octoate | 0.5 |

The above were combined in the order indicated and then stirred for about 15 seconds in a large-mouth glass jar 5 cm in diameter to produce what appeared to be a solution. This was exposed to the ultraviolet radiation through the side of the jar from a distance of about 20 cm from the center of the jar while it was slowly rotated and with continued stirring. The temperature started to increase at about 8 seconds and reached 30° C. at 30 seconds. After another 5 seconds the temperature reached 31° C. and the mixture became sufficiently thick to begin to climb the stirrer. The lamp was turned off, and the jar and contents were allowed to cool in darkness. The resultant syrup appeared to be homogeneous and had a viscosity at room temperature of 300 centipoises. The change in refractive index indicated about 5% conversion of the acrylate unsaturation.

EXAMPLES 2-7

A number of other coatable syrups were prepared substantially as in Example 1 except as indicated in the following table and that the stannous chloride dihydrate was in solution in the glycol:

| Example | Ingredients | Grams | End Temp. | Time (sec.) | Viscosity (cps.) | Conversion |
|---|---|---|---|---|---|---|
| 2 | IOA | 90 | | | | |
| | AA | 10 | | | | |
| | Stannous chloride dihydrate | 0.28 | 41° C. | 72 | 500 | 11% |
| | Polypropyleneglycol (MW 400) | 1.12 | | | | |
| | Photoinitiator | 0.2 | | | | |
| 3 | IOA | 70 | | | | |
| | AA | 30 | | | | |
| | Stannous chloride dihydrate | 0.4 | 40° C. | 70 | 2000 | 7% |
| | Polypropylene glycol (MW 400) | 1.6 | | | | |
| | Photoinitiator | 0.2 | | | | |
| 4 | IOA | 100 | | | | |
| | Stannous chloride dihydrate | 0.4 | 40° C. | 42 | 1200 | 10% |
| | Polypropylene glycol (MW 400) | 1.6 | | | | |
| | Photoinitiator | 0.25 | | | | |
| 5 | IOA | 100 | | | | |
| | Hexanediol diacrylate | 0.5 | 40° C. | 115 | 200 | 11% |
| | Stannous oleate | 1.18 | | | | |
| | Photoinitiator | 0.25 | | | | |
| 6 | Ethyl acrylate | 50 | | | | |
| | Stannous octoate | 0.3 | 50° C. | 135 | NT | NT |
| | Photoinitiator | 0.1 | | | | |
| 7 | 2-methylbutyl acrylate | 50 | | | | |
| | Stannous octoate | 0.3 | 45° C. | 120 | NT | NT |
| | Photoinitiator | 0.1 | | | | |

NT = Not Tested

EXAMPLE 8

(preparation of pressure-sensitive adhesive tape)

The starting ingredients of Example 2, except only 0.1 g photoinitiator, were partially polymerized (10% conversion of the acrylate unsaturation) as in Example 1 to provide a syrup having a viscosity of about 5000 cps. Into 100 g of the syrup was dissolved by shaking 0.1 g of 2,4-bis(trichloromethyl)-6-p-methoxystyryl-s-triazine. This was knife-coated at a 50-micrometer orifice over an adhesion-promoting subbing layer of a biaxially-oriented polyethylene terephthalate film. The coating was passed for 3 minutes beneath a bank of ultraviolet lamps at an intensity of about 1.8 milliwatts per cm$^2$ at about 10° C. under a nitrogen atmosphere containing about 20 parts per million oxygen. This polymerized the coating to a pressure-sensitive adhesive state. The refractive index change indicated about 100% conversion of the acrylate unsaturation.

The resultant pressure-sensitive adhesive tape was aggressively tacky and had excellent shear strength as indicated by the following test. One end of a 1.27 cm wide strip was adhered by its adhesive layer over a length of 1.27 cm to a stainless steel plate using a hard rubber roller. After being allowed to dwell one day at room temperature, the plate was mounted vertically and a 1000 g weight was suspended from the free end of the tape at ordinary room temperature. The weight had not fallen after 10,000 minutes, at which point the test was terminated.

EXAMPLE 9

(preparation of thick viscoelastic layer)

The syrup of Example 8 was poured into a polypropylene-lined mold (5×12 cm) to a depth of about 0.6 cm. In air, this was intermittently exposed to ultraviolet radiation from above, using the lamp of Examples 1–7 at a distance of 10 cm. Each time the temperature of the reaction mixture reached about 60° C., the lamp was turned off. Upon cooling to about 50° C., the lamp was again turned on. Further ultraviolet exposure was discontinued when there was no further temperature increase, indicating substantially complete polymerization. The product had the following properties: Shore A2 hardness, 20 top and bottom; tensile strength (ASTM D638-77a), 23 psi; elongation, 1250%; $T_g$ about −68° C. The product had almost no tackiness and was insoluble in methyl ethyl ketone. This indicates that the product had become crosslinked by the heat of polymerization.

The same syrup as used in Example 8 produced a thin coating which was aggressively tacky and not crosslinked. Apparently the heat of polymerization is dissipated from thin coatings with no observable crosslinking. In order to produce thin crosslinked coatings it has been necessary to add a crosslinking agent such as one of those identified hereinabove.

EXAMPLE 10

(preparation of thick viscoelastic layer)

The same ingredients used in Example 9 were used to make a single, fully polymerized layer 1.3. cm in thickness without first preparing a syrup. The product was indistinguishable from the product of Example 9.

EXAMPLE 11

(preparation of thick viscoelastic layer)

| | Grams |
|---|---|
| IOA | 90 |
| AA | 10 |
| Epoxy resin* | 10 |
| Photoinitiator | 0.25 |
| Stannous chloride dihydrate | 0.4 |
| Polypropylene glycol (MW 400) | 1.6 |

*3,4-epoxycyclohexylmethyl-3,4-epoxycyclohexane carboxylate

The above were stirred together to provide a compatible mixture which without further stirring was irradiated in air as in Example 9, reaching 40° C. in 30 seconds (whereas the same composition omitting the epoxy resin required 75 seconds to reach that temperature). Irradiation was continued until the temperature reached 60° C. and then only intermittently as in Example 9 until a substantially completely polymerized product was obtained. The product had a thickness of about 0.6 cm, was nontacky and had a $T_g$ of $-50°$ C. (whereas the same composition omitting the epoxy resin was somewhat tacky and had a $T_g$ of $-68°$ C.). Because the product had a specific $T_g$, it is assumed that the epoxy resin copolymerized with the acrylic monomers.

EXAMPLE 12

(preparation of pressure-sensitive adhesive tape)

|  | Grams |
|---|---|
| IOA | 70 |
| AA | 30 |
| Tackifier resin* | 20 |
| Photoinitiator | 0.2 |
| Stannous octoate | 0.5 |

*Highly saturated petroleum-based aliphatic hydrocarbon tackifying resin ("Arkon" P-115)

The tackifier was dissolved into the acrylic monomers and the photoinitiator and stannous salt were sequentially stirred in, followed by photopolymerizing in air with continued stirring as in Example 1 to provide a syrup of coatable viscosity. The syrup was knife-coated onto a subbed polyester film backing as described in Example 8 except to a coating thickness of about 125 micrometers. Onto the surface of the coating was laid a polyethylene terephthalate film having a silicone-release surface. The coating was then irradiated through the release film at a distance of about 20 cm for 3 minutes. The release layer was stripped away to expose an aggressively tacky pressure-sensitive adhesive layer.

EXAMPLE 13

(preparation of tack-free adhesive tape)

Example 12 was repeated except omitting the tackifier resin to provide a tack-free polymerized layer which developed aggressive tackiness when heated to about 100° C.

What is claimed is:

1. A photopolymerizable mixture comprising by weight
   (a) 100 parts of a composition which is polymerizable to a viscoelastic state and consists of 50–100 parts of one or both of alkyl acrylate and alkyl methacrylate and 0–50 parts of copolymerizable monoethylenically unsaturated monomer,
   (b) oxidizable tin salt dissolved in composition (a) in an amount providing at least 0.01 part of tin, and
   (c) addition-polymerization photoinitiator which is activatable by ultraviolet radiation and is dissolved in composition (a) in an amount providing about 0.01–5 parts of the photoinitiator.

2. A photopolymerizable mixture as defined in claim 1 wherein said oxidizable tin salt is a stannous salt.

3. A photopolymerizable mixture as defined in claim 1 wherein said composition (a) is polymerizable to a pressure-sensitive adhesive state.

4. A photopolymerizable mixture as defined in claim 1 wherein the composition (a) consists of a blend of (1) at least 88 parts of alkyl acrylate having 4–12 carbon atoms in its alkyl group or alkyl acrylates having an average of 4–12 carbon atoms in their alkyl groups and (2) up to 12 parts of the copolymerizable monomer, which blend copolymerizes to a pressure-sensitive adhesive state.

5. A photopolymerizable mixture as defined in claim 4 wherein at least part of the copolymerizable monomer has highly polar groups.

6. A photopolymerizable mixture as defined in claim 5 wherein the copolymerizable monomer having highly polar groups is selected from at least one member of the group consisting of acrylic acid, methacrylic acid, itaconic acid, acrylamide, methacrylamide, acrylonitrile, methacrylonitrile, N-substituted acrylamides, hydroxyalkyl acrylates, cyanoethyl acrylate, N-vinylpyrrolidone and maleic anhydride.

7. A syrup obtained by partially polymerizing a photopolymerizable mixture as defined in any of claims 1, 3, 4, 5, and 6, which syrup has a coatable viscosity of 300 to 10,000 centipoises at ordinary room temperature.

8. The polymeric product of photopolymerizing the photopolymerizable mixture of claim 1 to about 100% conversion of the acrylate unsaturation.

9. Method of making a viscoelastic material comprising exposing to ultraviolet radiation a layer of a photopolymerizable mixture as defined in claim 1.

10. Method of making a viscoelastic product comprising the steps of
    (1) mixing together by weight
        (a) 100 parts of a composition which is polymerizable to a viscoelastic state and consists of 50–100 parts of one or both of alkyl acrylate and alkyl methacrylate and 0–50 parts of copolymerizable monoethylenically unsaturated monomer,
        (b) oxidizable tin salt dissolved in an amount providing at least 0.01 part of tin, and
        (c) addition-polymerization photoinitiator which is activatable by ultraviolet radiation and is dissolved in an amount providing about 0.01–5 parts, and
    (2) exposing the mixture to ultraviolet radiation to photopolymerize the mixture to a viscoelastic state.

11. Method of making a syrup having a coatable viscosity comprising exposing a photopolymerizable mixture as defined in claim 1 to ultraviolet radiation until the viscosity increases to 300 to 10,000 centipoises at ordinary room temperature.

* * * * *